United States Patent [19]

Allen

[11] 3,870,509

[45] Mar. 11, 1975

[54] METHOD OF DISPOSING OF PARTICULATE SCRAP IRON

[75] Inventor: John E. Allen, Lake Forest, Ill.

[73] Assignee: Ferro-Carb Agglomeration Ltd., Inc., Chicago, Ill.

[22] Filed: Nov. 19, 1973

[21] Appl. No.: 416,966

Related U.S. Application Data

[63] Continuation-in-part of Ser. No. 359,776, May 14, 1973.

[52] U.S. Cl. .................................................. 75/44 S
[51] Int. Cl. ....................................... C21b 1/30
[58] Field of Search............ 75/4, 3, 43, 44 R, 44 S

[56] References Cited
UNITED STATES PATENTS 2,405,278  8/1946  Vance ................................ 75/44 R
3,316,081  4/1967  Bratton ................................... 75/3
3,725,034  4/1973  Joseph et al. ............................ 75/4

*Primary Examiner*—L. Dewayne Rutledge
*Assistant Examiner*—M. J. Andrews
*Attorney, Agent, or Firm*—Milton Zucker

[57] ABSTRACT

Particulate scrap iron is disposed of by blending it with a bituminous, hydrocarbonaceous binder, forming briquettes from the mixture, and treating the briquettes with an oxygen-containing gas at 350° to 600°F to selectively react with the hydrogen and unsaturated hydrocarbon in the binder, to obtain strong briquettes which can be used as a source of iron in steelmaking processes.

3 Claims, No Drawings

METHOD OF DISPOSING OF PARTICULATE SCRAP IRON

RELATED APPLICATION

This application is related to my application Ser. No. 359,776, entitled "Control of Pollution by Recycling Solid Particulate Steel Mill Wastes" and filed May 14, 1973, and is a continuation-in-part thereof.

BACKGROUND OF THE INVENTION

1. Field of the Invention

This invention is concerned with the recycling of particulate scrap iron products such as foundry chips, and machine shop turnings or borings.

2. The Prior Art

Scrap iron is one of the pervasive sources of pollution throughout the world. It is generally collected and remelted in various iron- and steelmaking processes. Small iron pieces, such as foundry chips and machine shop turnings or borings, have been particularly troublesome, since they are difficult to collect, tend to float in the metal-making processes and often have contaminants on them which make their use in steelmaking difficult. In cupola operations, for example, the use of such particles results in irregular operations. It has often been necessary to find rather costly ways of disposing of such scrap, in order to prevent serious pollution problems, despite the fact that such scrap often contains hydrocarbons which could be a useful source of fuel values in the metal-making process.

This invention aims to provide an economic solution to the problem of disposing of such iron and steel scrap. The invention is an outgrowth of a similar discovery concerning the treatment of steel mill wastes, disclosed and claimed in my copending application Ser. No. 359,776, entitled "Control of Pollution by Recycling Solid Particulate Steel Mill Wastes" and filed May 14, 1973.

STATEMENT OF THE INVENTION

In accordance with this invention, particulate iron and steel scrap (−¼ inch) is converted into a product useful as a prime feed for iron- and steelmaking operations, by a process involving briquetting the particulate scrap with about 2 to 10%, and preferably about 3 to 5%, based on total briquette weight, of a hydrocarbonaceous binder which has a ball and ring softening point below 212°F (ASTM Method: E 28-58T), heating the briquettes in an atmosphere of gas containing at least 10% of oxygen at a gas temperature of between about 350° and 600°F, and preferably 400° to 500°F, for between 30 and 90 minutes, whereby the oxygen selectively reacts with the hydrogen to produce a marked exotherm, which appears to form a chemical bond between the iron particles and the carbon of the binder. The partially dehydrogenated briquettes may be cooled and used as feed to a cupola, blast furnace or open hearth furnace, or they may be devolatilized at higher temperatures (1,400° to 2,000°F) in an inert atmosphere to produce devolatilized briquettes which are useful as feed into cupolas and electric furnaces.

DETAILED DESCRIPTION OF THE INVENTION

As stated above, this invention is an outgrowth of my discovery that particulate steel mill wastes, such as blast furnace dust, mill scale and coke breeze, could be economically recycled by briquetting with small amounts of bituminous binder, followed by selective oxidative dehydration in a gas containing at least 10% of oxygen, at 350° to 600°F, to induce bonding between the carbon of the binder and the iron derived from the dust. It seemed possible that the process might be useful with particulate metal rather than with oxidized dust, and this has proved to be the case.

I may use any scrap iron which is otherwise difficult to dispose of; it is merely necessary that the scrap be in particles no larger than about ¼ inch in size. Foundry chips and fine machine shop waste are typical of materials which can be used in my process; larger pieces, such as stamping waste, can ordinarily be bundled and fed into metal-making operations without further difficulty.

These fine pieces of scrap iron are mixed in some convenient mill (e.g., a pug mill) with the binder selected. The binder should be hydrocarbonaceous, have a ball and ring softening point (ASTM Method: E 28-58T) of below 212°F (for convenience in handling) and be free of substantial amounts of combustibles volatile at 500°F. Typical useful binders include coal tars and pitches, petroleum residue pitches or petroleum reforming bottoms, and the like. I have used tars with a 100°F softening point and a viscosity of 5 relative to water, and pitches with softening points approaching 212°F; it is merely necessary to use a mixing temperature appropriate to the binder used, not exceeding about 75°F above its softening point. Coke oven tars, which contain naphthalene, can be used after the naphthalene is stripped. The presence of substantial amounts of naphthalene (or other combustibles volatilizing below 500°F) must be avoided because it may cause fires to occur in the dehydrogenating oven, with loss of process control.

At least 2% of binder is needed to get sufficient strength in the final briquettes for any purpose — at about 3 to 8%, optimum results are obtained. Up to 10% of binder may be used without penalty — binder levels above 10% are not only uneconomic, but tend to cause softening and deformation in the early stages of dehydrogenation.

The metal fines and binder are thoroughly mixed, as in a pug mill, at any suitable mixing temperature not in excess of about 75°F above the softening point of the binder. Higher temperatures are avoided to insure setting of the raw briquettes sufficiently to prevent deformation in the dehydrogenation step. Mixing is generally complete in 5 to 10 minutes, depending on the formulation and equipment used.

The mix is formed into shapes by extrusion, or by compaction as with a piston press, such as the Wisconsin type, or most preferably by roll-briquetting. The size of briquette made is dictated by the particular recycle equipment to be used. Blast furnaces are preferably charged with 2 × 2 × 1 inch briquettes; cupolas (e.g., a Whiting 4 to 6 foot diameter cupola) prefer larger briquettes (2 × 2 × 4 inches), while electric furnaces, open hearths and basic oxygen converters require somewhat smaller sizes than the blast furnaces.

The raw briquettes are transferred from the forming device to the dehydrogenation oven. There, the briquettes are treated in a stream of oxygen-containing gas at a temperature of 350° to 600°F, for a time sufficient to cause substantial but not complete dehydrogenation and polymerization of the binder, and reaction between it and the iron to form a firm bond. This product may be charged as is into a blast furnace, steel furnace or foundry cupola, or it may be further devolatilized if the end use so dictates.

Any type of furnace may be used for the dehydrogenation. Typically, I use a chain grate carrying a bed of briquettes about 12 inches high, with air as the oxygen-containing gas. The reaction is rather slow at 350°F gas temperature, but is complete in about 90 minutes at 10% binder content, and in about 60 minutes at 5% binder content. At gas temperatures of 600°F, extreme care must be taken, but high speed of reaction obtains — as low as 30 minutes at 3% binder content. For optimum results, I prefer to operate at gas temperatures of about 400 to 500° F.

The reaction of the oxygen in the gas with the hydrogen in the binder is highly exothermic, producing about 300 to 350 BTU per pound of binder. The air forced through the bed not only provides the oxygen, but acts to remove this heat of reaction. With a typical 12 inch high bed, the velocity necessary to remove this heat is between 3 to 10 feet per second (i.e., below 3 feet per second, fines occur, while above 10 feet per second the reaction leads to briquette destruction). The minimum oxygen content of the gas used is about 10%, although I prefer to operate with 15% or more oxygen.

In the dehydrogenation, the binder is carbonized to form a structure which is sufficiently strong to hold the briquette together under the normal forces of handling and further processing. It seems clear that there is a real attraction between the iron and the carbon of the binder, to form such strong briquettes with such low binder ratios.

The partially dehydrogenated briquettes burn with a yellow flame, which is useful in both open hearth and blast furnace operations. When recycled in this fashion, the recovery of iron and carbon values in the briquettes, and the improvement in furnace operations, appear to result in the disposal of the wastes with an economic advantage.

For use in cupolas or electric furnaces, it is desirable that the briquettes be low in volatiles (under about 3%). For such uses, the dehydrogenated briquettes may be further processed to reduce the remaining volatiles to under about 3%. Heating in inert atmosphere to 1,400° to 1,600°F for 10 to 20 minutes will accomplish this. At these temperatures, iron carbide appears to be formed at the particle interfaces, resulting in briquettes of even greater strength.

The resultant products — whether partially dehydrogenated or further treated to low volatility — are strong and abrasion-resistant, and operate well in the uses for which they are intended.

SPECIFIC EXAMPLES OF THE INVENTION

The following specific examples of the invention are given by way of illustration and not by way of limitation.

Example 1 — Engine Foundry Chips

A formulation consisting of:
11.2 pounds of cast iron chips from an engine foundry, heated to 200°F
0.6 pound of coke oven pitch (high-temperature coke oven tar distilled to 150°F ball and ring softening point)
was mixed for 5 minutes at 195°F. Pellets 1⅛ inches in diameter and 1 inch high were pressed from this mix at 10,000 psig. These pellets were bonded in air at 500°F by recirculating this heated air through a 12 inch bed of briquettes for 120 minutes. On cooling, they analyzed as follows:

| | |
|---|---|
| Applied force necessary to crush | 3,800 pounds |
| Volatile matter | 2.45 wt. % |
| Behavior on heating to 3500°F | Burns with bright yellow flame for short period; then sinters and melts. |

Example 2

A formulation consisting of:
92 pounds of general scrap (steel and cast iron) crushed to pass the ¼ inch mesh screen
8 pounds of coke braise crushed to pass the ⅛ inch screen
8 pounds of coke oven tar pitch of a 153°F softening point
was blended in a standard pug mill for 10 minutes at 200°F. This blend was fed through a briquetting machine with rolls 10 inches in diameter where the force needed to separate the rolls was maintained at 10,000 pounds per inch of roll width. Pillow briquettes of a nominal 1½ inches long × 1½ inches wide × 1 inch thick were produced and baked in an oven where air at 460°F was circulated and recirculated through a bed of newly formed briquettes, 24 inches high. This baking in air was continued for 120 minutes, at which time the air-baked briquettes were cooled and had the following properties:

| | |
|---|---|
| Crushing strength - total force in pounds exerted on a briquette between the platens of a hydraulic press | 1,100 |
| Abrasion resistance - amount removed from the briquettes after tumbling in an ASTM tumbler drum for 700 revolutions at 25 RPM, expressed as wt. % passing a 0.25 inch square hole screen | 28 |
| Volatile matter - as per ASTM method for determining the residual remaining after heating, in exclusion of air, for 7 minutes at 1750°F, expressed as weight % | 4.5 |
| Burning resistance - as measured by the behavior for the air-baked briquette when attacked by an oxy-acetylene or oxygen propane flame for 5 minutes and then by 100% oxygen until some portion is consumed | Burns with bright yellow flame for a short period, then sinters, glows red and partially melts. It does not lose form. |

Example 3

A formulation consisting of:

80 pounds of cast iron scrap, crushed to pass the ¼ inch mesh screen, which has been partially oxidized by rusting in storage and contained residual "cutting" oils as a product of the original machinery of the mother casting 5 pounds of coke braise, crushed from by-product coke in handling, and further crushed to pass the ¼ inch screen 8 pounds of coke oven tar pitch of 153°F softening point viscosity.

was blended, formed and air-baked as in Example 2. When tested, these briquettes had the following properties:

| | | |
|---|---|---|
| Crushing strength | (ibid Example 2) | 1,000 pounds |
| Abrasion resistance | (ibid Example 2) | 25 wt. % |
| Volatile matter | (ibid Example 2) | 6.5% |
| Burning resistance | (ibid Example 2) | as in Example 2. |

A portion of the briquettes was further heated in an inert atmosphere at 1,500°F for 25 minutes to reduce the volatiles to under 3%. The resultant briquettes were somewhat stronger than those containing 6.5% of volatiles, and could be fed to electric furnaces.

Obviously, examples may be multiplied without departing from the scope of the invention as defined in the claims.

What is claimed is:

1. The method of disposing of particulate iron and steel scrap consisting essentially of metallic iron in pieces no larger than ¼ inch which comprises (1) mixing the particulate scrap with a bituminous binder having a ball and ring softening point below 212°F, and free of combustibles volatile at 500°F to produce a mix containing between 2 and 10% of binder with the balance of the mix being essentially the particulate scrap; (2) briquetting the mix; (3) heating the briquettes in gas containing at least 10% of oxygen at a gas temperature of 350° to 600°F for 30 to 90 minutes to selectively remove hydrogen from the binder and induce a cementing action between the binder and the iron; and (4) recycling the briquettes into a metal-making process.

2. The method of claim 1, in which the briquettes are further heated, between steps 3 and 4, in an inert atmosphere at a temperature between 1,400°F and 2,000°F to reduce the volatiles to below 3%.

3. The method of claim 1, in which the binder content is between 3 and 5%.

* * * * *